United States Patent [19]

Kawakita

[11] Patent Number: 4,572,492
[45] Date of Patent: Feb. 25, 1986

[54] XYZ VISE

[75] Inventor: Mayuto Kawakita, Shizuoka, Japan

[73] Assignee: Sansin Kiko Co. Ltd., Shizuoka, Japan

[21] Appl. No.: 626,985

[22] Filed: Jul. 2, 1984

[30] Foreign Application Priority Data

Jul. 16, 1982 [JP] Japan .............................. 57-123017

[51] Int. Cl.⁴ ............................................. B23Q 1/12
[52] U.S. Cl. ..................................................... 269/75
[58] Field of Search ............... 269/75, 8, 71; 335/301, 335/285, 286, 288

[56] References Cited

U.S. PATENT DOCUMENTS

| | | | |
|---|---|---|---|
| 2,796,788 | 6/1957 | Bohn | 269/75 |
| 3,428,305 | 2/1969 | Bohn | 269/75 |
| 3,815,892 | 6/1979 | Tulk | 269/75 |
| 4,251,791 | 2/1981 | Yanagisawa et al. | 335/285 |
| 4,329,673 | 5/1982 | Uchikune et al. | 335/288 |

FOREIGN PATENT DOCUMENTS 59-14474 1/1984 Japan .

Primary Examiner—Robert C. Watson
Attorney, Agent, or Firm—Schwartz & Weinrieb

[57] ABSTRACT

An XYZ vise comprises a spherical body having a permanent magnet accommodated therein, a reference plate mounted on the body to be rotatable about the x- and y-axes, and a vise unit mounted on the reference plate to be rotatable about the z-axis. The spherical body comprises a pair of hemispherical members which can be selectively magnetized or demagnetized by rotating the permanent magnet. When the hemispherical members are demagnetized a workpiece clamped by the vise unit can be angularly positioned with respect to all of the x-, y- and z-axes and when they are magnetized the workpiece can be securely held in the set position.

21 Claims, 7 Drawing Figures

XYZ VISE

BACKGROUND OF THE INVENTION

1. Field of the Invention

This invention relates to an XYZ vise which uses a spherical body as a reference body, has a reference plate and vise unit mounted on the reference body and, by use of magnetic attraction, is able to fix a workpiece at any desired angle simply and securely.

2. Description of the prior art

Vises are widely used for firmly retaining metal workpieces during various types of machining operations such as cutting and drilling. Among such vises there are known the one-directional vise which is capable of rotating the workpiece about the y-axis (allowing it to be swung right and left), the two-directional vise which can further rotate the workpiece about the x-axis (allowing it to be swung forward and backward) and the three-directional (XYZ) vise which can further rotate the workpiece about the z-axis (allowing it to be swung about the vertical axis).

In these conventional vises, however, one- and two-directional rotation is achieved by using a screw mechanism to rotate the workpiece about transverse support shafts, or three-directional rotation is achieved by using a semispherical member. As a result, conventional vises are troublesome to operate and incapable of providing high precision. They are also complicated in structure and as a consequence are costly.

OBJECT OF THE INVENTION

The object of this invention is to provide an XYZ vise which can securely hold a workpiece at any desired angle simply and with high positional precision, and which has a simple structure and is easy to operate.

SUMMARY OF THE INVENTION

The XYZ vise according to this invention comprises a spherical body having a rotatable permanent magnet fitted therein, a reference plate mounted on this spherical body so as to be rotatable about the x- and y-axes, and a vise unit mounted on the reference plate so as to be rotatable about the z-axis. The reference plate and the vise unit which are mounted on the spherical body can be freed to rotate or prevented from rotating by selectively rotating the permanent magnet.

The spherical body is formed by linking two hemispherical bodies with at least one magnet shielding member sandwiched therebetween and the permanent magnet is inserted into a through-hole in the so-formed spherical body in such manner as to be free to rotate therein. When the permanent magnet is rotated so that its poles lie parallel to the opposed surfaces of the hemispherical members, almost no magnetic field is produced in the hemispherical members and as a result the reference plate and the vise unit mounted on the spherical body can be freely rotated. When the permanent magnet is rotated to orient its poles perpendicularly to the opposed surfaces of the hemispherical members, the opposite extremities of the hemispherical members become magnetized in opposite polarity and in this state the reference plate and the vise unit are strongly adhered to the spherical body by magnetic force. As a consequence, a workpiece clamped in the vise unit can be easily fixed in any desired angular posture.

BRIEF DESCRIPTION OF THE DRAWINGS

The invention will now be described in more detail with reference to the drawings, wherein.

DESCRIPTION OF THE PREFERRED EMBODIMENTS

Figure 1:
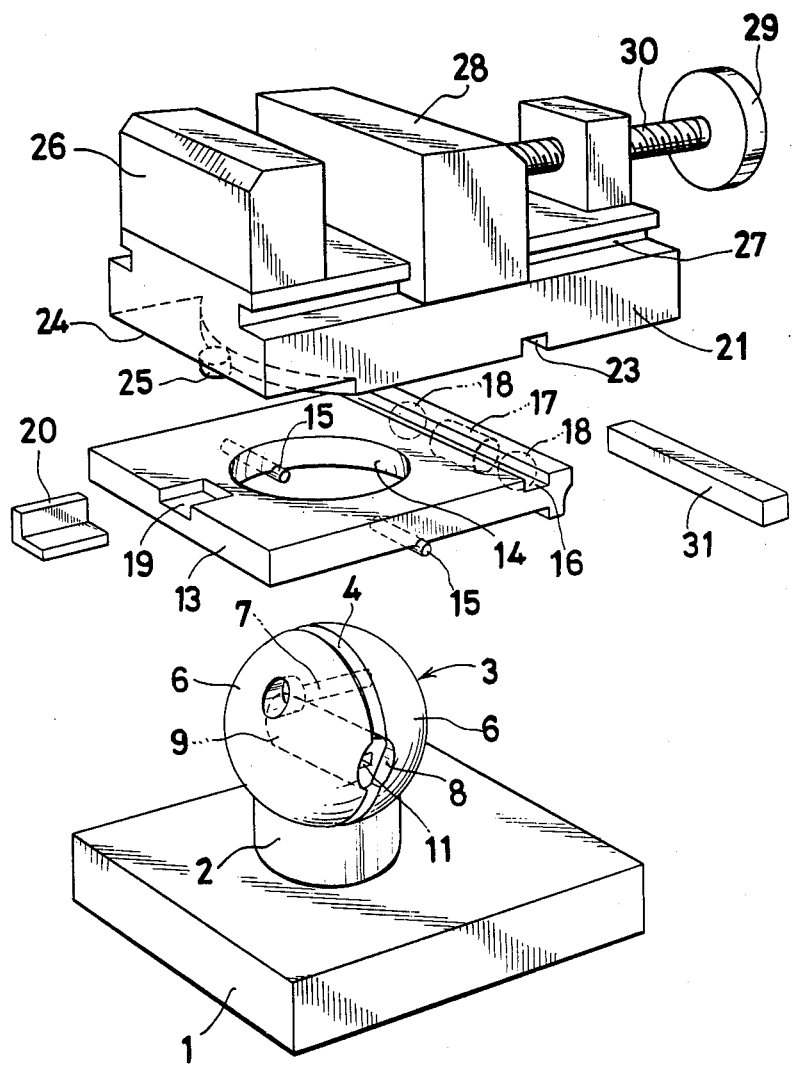
FIG. 1 is an exploded perspective view of one embodiment of the XYZ vise according to this invention.
Figure 2:
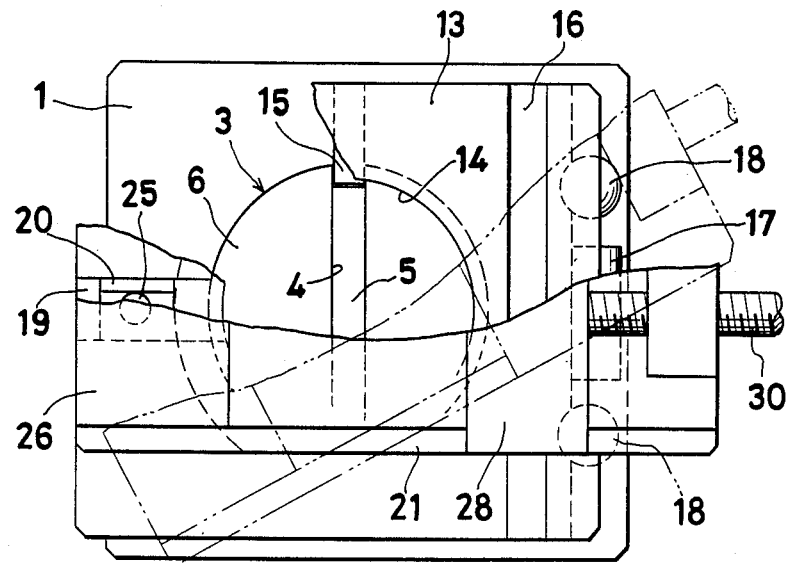
FIG. 2 is a partially cut-away plan view of the same.

A first embodiment of the XYZ vise according to this invention will now be described with reference to FIGS. 1 to 5. A support column 2 is provided to stand upright on the upper surface of a base 1 and a spherical body 3, the surface of which constitutes the reference surface for the XYZ vise, is mounted at the top of the support column 2.

The spherical body 3 is made from iron, iron alloy or other magnetic material. Except for a shallow guide groove 4 provided at the center thereof, the outer surface of the spherical body 3 is almost perfectly spherical. In this embodiment, the spherical body 3 consists of two approximately hemispherical members 6 fixed together by one or more bolts 7 with a magnetic shielding member 5 sandwiched therebetween. The outer surface of the magnetic shielding member 5 constitutes the floor of the guide groove 4. The lower portion of the spherical body 3 is provided with a through-hole 8 that runs between and parallel to the opposed walls of the hemispherical members 6. A permanent magnet 9 of oval cross section having north and south poles 10 at the opposite ends of the oval is fitted into the through-hole 8. In at least one of the exposed ends of the permanent magnet 9 is formed a polygonal hole 11 in which a tool 12 can be inserted for the purpose of rotating the permanent magnet 9 within the through-hole 8, as seen, for example, in FIG. 4.

Figure 4:
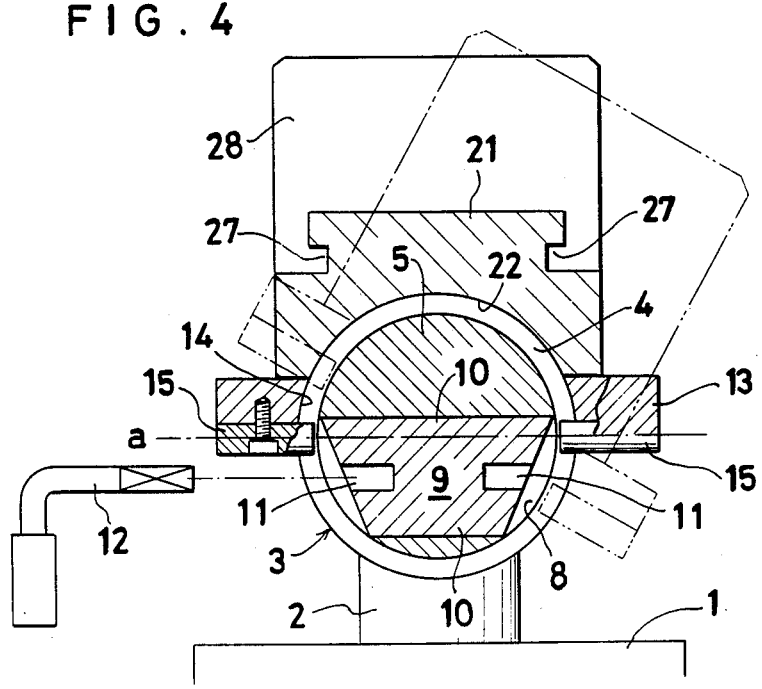
FIG. 4 is a vertical cross-sectional view of the same taken perpendicular to the view of FIG. 4.
Figure 5:
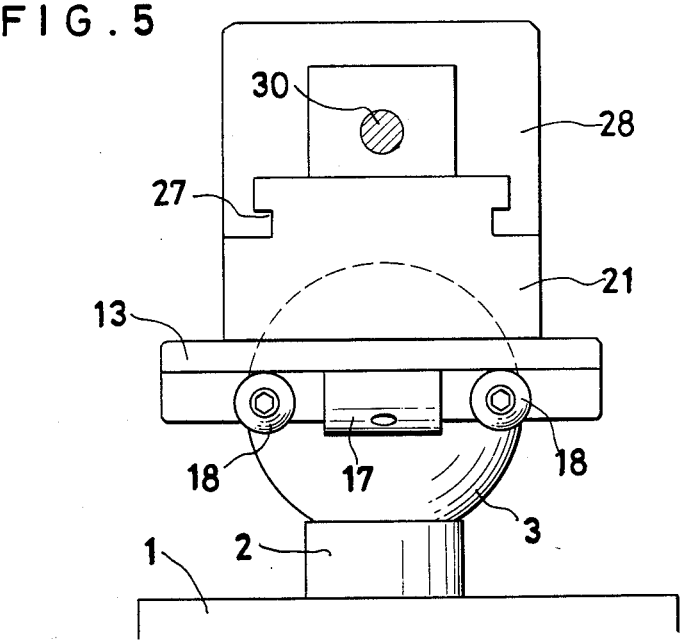
FIG. 5 is a side view of the same.

The reference plate 13 is fitted onto the upper part of the spherical body 3. The reference plate 13 has a circular hole 14 the inner surface of which fits snugly on the outer surface of the spherical body 3. On the bottom surface of the reference plate 13 are provided an opposing pair of guide pins 15 the inward tips of which project into the circular hole 14. Thus when the inner surface of the circular hole 14 is fitted snugly onto the outer surface of the spherical body 3, the tips of the guide pins 15 on opposite sides of the reference plate 13 project into the guide groove 4. The arrangement is such that at this time the line a passing through the axes of the guide pins 15 passes through the center of the spherical body 3, as seen in FIG. 4.

The reference plate 13 has a fixing groove 16 formed at one side of its upper surface and has a cylindrical member 17 and two spherical block members 18, one on either side of the cylindrical block member 17, provided on one side edge thereof. The top surface of the reference plate 13 is further provided at the opposite side thereof with a shallow groove 19 for accommodating a positioning key 20.

Figure 3:
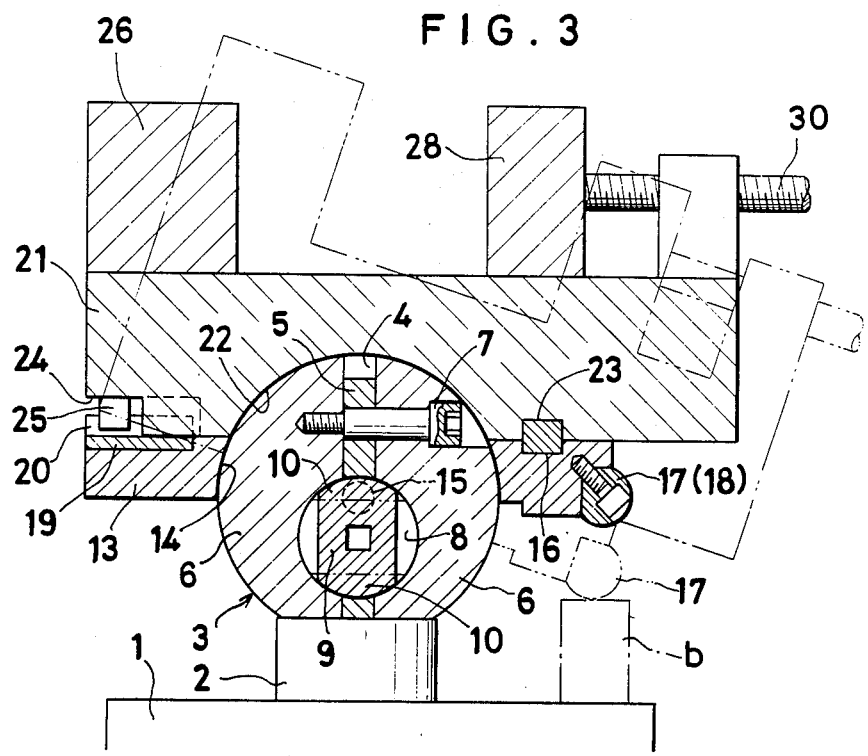
FIG. 3 is a vertical cross-sectional view of the same.

The vise unit 21 which is mounted on the reference plate 13 fitted onto the spherical body 3 has formed in the bottom thereof a recessed portion 22, as seen in FIG. 3, configured to make intimate contact with the upper part of the spherical body 3. It further has a fixing groove 23 positioned to register with the fixing groove 16 in the reference plate 13, a cut-away portion 24 which faces the positioning key 20 in the reference plate 13, and a positioning pin 25 provided at the center of the cut-away portion 24 for engagement with the positioning key 20.

The vise unit 21 further has on its upper surface, a fixed jaw 26 and a movable jaw 28 which is slidable along a pair of rails 27. The movable jaw 28 is moved toward and away from the fixed jaw 26 by turning a handle 29 at one end of a screw 30. The fixed jaw 26 and the movable jaw 28 are used for firmly clamping a workpiece therebetween.

Being constructed as described in the foregoing, the reference plate 13 can be swung in a first direction with respect to the spherical body 3 by rotating it about the axes of the guide pins 15 (chain line in FIG. 3) and can be swung in a second direction perpendicular to the first direction by causing the guide pins to slide along the guide groove 4 (chain line in FIG. 4). In either case, the vise unit 21 makes the same movement as the reference plate 13. Moreover, the angular positioning of the reference plate 13 in the first direction can be carried out with high precision by supporting the cylindrical block member 17 on a block b of high dimensional precision mounted on the base 1, as seen, for example, in FIG. 3. By changing the block b it thus becomes possible to vary the angle of inclination in the first direction as desired. The angular positioning of the reference plate 13 in the second direction can be set with high precision by providing two blocks of different height on the base 1 and supporting the spherical block member 17 on the top of these blocks. In other words, by supporting the two spherical block members 18 on respective blocks of different height, the reference plate 13 is caused to rotate in the second direction as the guide pins 15 are guided along the guide groove 4, and the vise unit 21 is rotated likewise. This movement in the second direction is perpendicular to that in the first direction and the angular positioning in this direction can be freely set by using two blocks of different height.

When there is no need to change the angle of the vise unit 21 with respect to the reference plate 13, the positioning pin 25 is stopped against the positioning key 20 on the reference plate 13 and a key 31 is inserted into the fixing groove 16 of the reference plate 13 and the fixing groove 23 of the vise unit 21. This fixes the reference plate 13 and the vise unit 21 together as if they were a single unit and permits rotation of the vise only in the first and second directions. On the other hand, when the key 31 is removed from the grooves 16 and 23, the vise is freed to rotate on the upper surface of the reference plate 13 about a vertical axis passing through the center of the spherical body 3. This constitutes the third direction of rotation and in this case it is possible to provide one or both of the reference plate 13 and the vise unit 21 with angular scales so as to set the angular position of the vise in the third direction with respect to these angular scales. Alternatively, it is possible to provide a transverse direction positioning block (not shown) at the forward edge of the top surface of the reference plate 13 and to bring one end of this block against the positioning key 20 while bringing the positioning pin 25 into abutment with its other end. This arrangement makes it possible to set the angle of the vise 21 by a simple and accurate method based on trigonometric calculation.

The angular positioning of the reference plate 13 and the vise unit 21 can be carried out only when the permanent magnet 9 is positioned vertically within the through-hole 8. More specifically, when the permanent magnet 9 is vertically oriented, its north and south poles are pointed up and down, in which position the magnetic shielding member 5 prevents any appreciable magnetic field from being produced in the hemispherical members 6. Therefore, the reference plate 13 and the vise 21 are free to rotate about the spherical body 3, making it possible to set their angular position in the first, second and third directions using the various blocks as described above.

After the vise unit 21 has been angularly positioned as required, the tool 12 is used to turn the permanent magnet 9 to the horizontal position as shown by the solid lines in FIG. 3. As a result, the north and south poles 10 act on the respective hemispherical members 6 so that the reference plate 13 and the vise unit 21, both of which are made of magnetic material, are drawn to and fixed on the surface of the spherical body 3 by the magnetic force acting through the spherical body 3. As a result, the base 1 of the XYZ vise can be fixed on the table of a machine tool and a workpiece clamped in the vise unit 21 can be ground, cut, drilled or otherwise machined. After the workpiece has been subjected to a given machining operation, it can be removed from the vise or, if required, can be rotated to another angular orientation after the permanent magnet 9 has been rotated to the vertical position.

With the vise of the above-described structure, the reference plate 13 and the vise unit mounted thereon can be rotated about each of the x-, y- and z-axes so that the workpiece clamped in the vise unit can as desired be set at any angular orientation whatever.

The present invention is not limited to the structure described in the foregoing but encompasses any other structure able to provide the functions provided by the embodiment just described. Fundamentally, the XYZ vise according to this invention need only be provided with a spherical body, a permanent magnet rotatably accommodated within the spherical body, a guide groove formed in the spherical body for guiding the movement of the reference plate and the vise unit, and a magnetic shielding member for making it possible to selectively magnetize the spherical body. Thus, in view of these fundamental requirements, it is also possible to provide a modified embodiment of the invention as described in the following.

Figure 6:
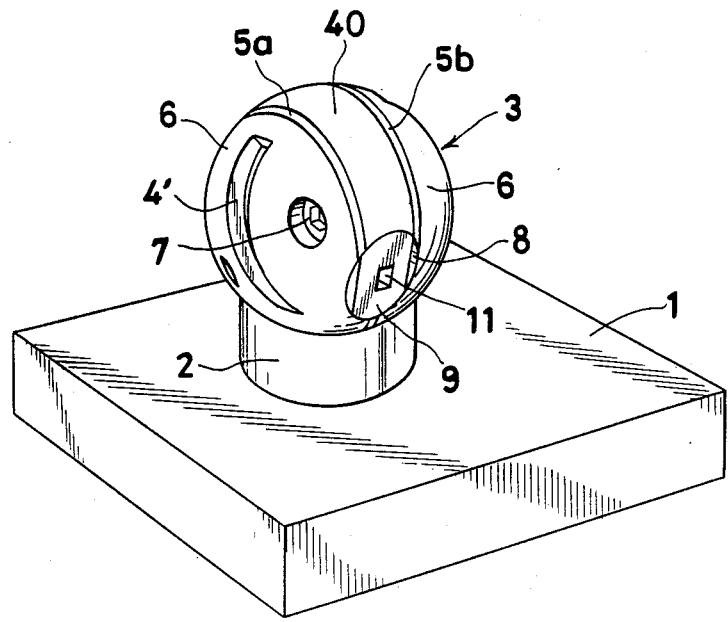
FIG. 6 is a perspective view of another embodiment of the invention.
Figure 7:
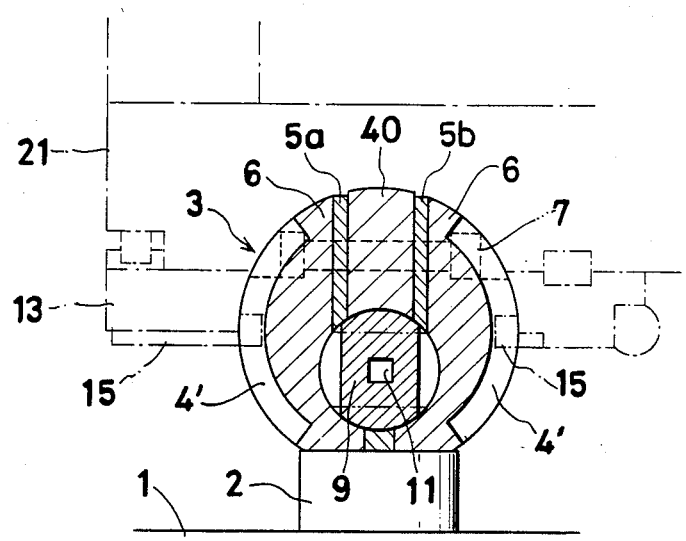
FIG. 7 is a side view of the same.

In the second embodiment of the invention shown in FIGS. 6 and 7, those elements denoted by the same reference numerals as those in the first embodiment are equivalent in function to those in the first embodiment and will not be explained again here.

In this embodiment, two magnetic shielding members 5a, 5b are provided to intervene between the two hemispherical members 6 and the region between the two magnetic shielding members 5a, 5b is occupied by an intermediate member 40 of the same material as the hemispherical members 6. The thickness of this intermediate member 40, which is the same as the distance between the two magnetic shielding members 5a, 5b, is substantially the same as the width (thickness) of the permanent magnet 9. More specifically, the arrangement is such that when the reference plate 13 and the vise unit 21 are in the non-fixed condition, that is, when the poles of the permanent magnet 9 are oriented parallel to the inner surfaces of the hemispherical members 6 (vertically in the figures), the pole of the permanent magnet 9 in contact with the intermediate member 40 will be prevented from producing a magnetic field in the hemispherical members 6 by the magnetic shielding members 5a, 5b.

Further, in this embodiment, the surface of the spherical body 3 is provided with a guide groove 4' which runs perpendicular to the magnetic shielding members 5a, 5b and serves to guide the motion of the guide pins 15 of the reference plate 13. Although the figures show two guide grooves 4' located one on either side of the magnetic shielding members 5a, 5b, it is of course also possible to provide only one continuous groove instead.

In accordance with this embodiment, the support column 2 and the base 1 are made of magnetic material so that when the vise is placed on the table of a machine tool and the vise unit 21 and the reference plate 13 are magnetically fixed in place for carrying out a machining operation, the vise will be magnetically fixed to the table making it possible to carry out the machining work in a stable manner insofar as the table is made of a magnetic material. On the other hand, when the machining operation is not in progress and the reference plate 13 and the vise unit 21 are in the released state, there is almost no magnetic attraction between the base 1 and the table of the machine tool so that the vise can be moved about with ease. In other words, when the vise is to be moved across the table or is to be lifted therefrom, it is only necessary to rotate the permanent magnet 9 so that one of its poles, the north pole, for example, is opposed to the intermediate member 40. In this condition, the polarity at the outer extremity (top) of the intermediate member 40 also becomes north while the other pole (south pole) of the permanent magnet 9 which joins the hemispherical members 6 through its contact with them at their intermediate portion causes the other ends of the hemispherical members 6, that is, the ends having the intermediate member 40 intervening therebetween (upper ends), to assume the same polarity (south polarity). On the other hand, almost no magnetic field passes into the support column 2 in contact with the bottom portions of the two hemispherical members 6 or into the base 1 in contact with the support column 2 so that in this condition the vise itself is very little affected by the magnetic force of the permanent magnet 9 and can be easily moved on the table or removed therefrom.

As can be seen from the foregoing, the present invention provides a reference plate and a vise unit which are mounted on a spherical body which is supported on a base in an arrangement which allows the reference plate and the vise unit to be rotated about the x- and y-axes and further makes the vise unit rotatable with respect to the reference plate, thus making it possible to rotate the vise unit about all three axes of a three-dimensional coordinate system. As a consequence, a workpiece clamped by the vise can be easily and precisely positioned with respect to the x-, y- and z-axes. Moreover, the XYZ vise according to this invention is extremely simple in structure and has great practical utility.

Obviously, many modifications and variations of the present invention are possible in light of the above teachings. It is therefore to be understood that within the scope of the appended claims, the present invention may be practiced otherwise than as specifically described herein.

What is claimed is:

1. An XYZ vise comprising a spherical body consisting of two opposing hemispherical members and having a through-hole of circular cross section passing along the opposing surfaces of said hemispherical members;
   at least one magnetic shielding member intervening between said two hemispherical members;
   a permanent magnet rotatably accommodated in said through-hole;
   a reference plate mounted on said spherical body to be rotatable about the x-axis and the y-axis; and
   a vise unit rotatably mounted on said reference plate; whereby said reference plate and said vise unit can be selectively fixed on or released from said spherical body by rotating said permanent magnet.

2. An XYZ vise according to claim 1, further comprising at least one guide groove provided in the surface of said spherical body and a pair of guide pins provided on said reference plate, the rotation of said reference plate mounted on said spherical body being guided by the engagement of said guide pins in said guide groove.

3. An XYZ vise according to claim 2, wherein a single magnetic shielding member is provided between said two hemispherical members and said guide groove is formed along the outer edge of said magnetic shielding member.

4. An XYZ vise according to claim 2, wherein two magnetic shielding members are provided between said hemispherical members, and an intervening member of a thickness approximately equal to the thickness of said permanent magnet is provided between said two hemispherical members.

5. An XYZ vise according to claim 1, further comprising a polygonal hole provided in at least one end of said permanent magnet, said polygonal hole being adapted for the insertion of a tool for rotation of said permanent magnet.

6. An XYZ vise according to claim 1, wherein said spherical body is mounted on a base.

7. A vise, for supporting a workpiece, movable within three degrees of freedom about three mutually orthogonal X-Y-Z axes relative to a base, comprising:
   a substantially spherical body comprising two laterally spaced hemispherical portions fabricated from magnetic material;
   at least one magnetic-shielding member, fabricated from a non-magnetic material, interposed between said two laterally spaced magnetic hemispherical portions of said substantially spherical body;
   a support plate fabricated from magnetic material;
   means defined between said substantially spherical body and said support plate for movably mounting said support plate upon said substantially spherical body about two mutually orthogonal axes;
   a vise unit, fabricated from magnetic material, mounted upon said support plate so as to be movable about a third one of said three mutually orthogonal axes;
   means defining a bore within said substantially spherical body and said hemispherical portions thereof; and
   a permanent magnet rotatably disposed within said bore between a first position at which the poles of said magnet transcend said magnetic-shielding member so as to magnetically interconnect said hemispherical portions of said substantially spherical body whereby said support plate and said vise unit will be magnetically locked in position relative to said substantially spherical body, and a second position at which the poles of said magnet will be disposed upon opposite sides of said magnetic-shielding member whereby said support plate and said vise unit are movable relative to said substantially spherical body so as to angularly position said workpiece disposed within said vise unit relative to said substantially spherical body and said base and about said three mutually orthogonal X-Y-Z axes.

8. A vise as set forth in claim 7, wherein said means for movably mounting said support plate upon said substantially spherical body comprises:

circumferentially defined groove means provided upon said substantially spherical body; and trunnion means provided upon said support plate and disposed within said groove means of said substantially spherical body, whereby a first movement mode of said support plate relative to said substantially spherical body occurs about the axis defined between said trunnion means, while a second movement mode of said support plate relative to said substantially spherical body occurs as a result of movement of said trunnion means within said circumferentially defined groove means.

9. A vise as set forth in claim 8, wherein:
said magnetic-shielding member and said groove means are disposed in a co-planar manner within said substantially spherical body.

10. A vise as set forth in claim 8, wherein:
said magnetic-shielding member and said groove means are defined within mutually perpendicular planes within said substantially spherical body.

11. A vise as set forth in claim 7, wherein:
a single non-magnetic shielding member is interposed between said hemispherical portions.

12. A vise as set forth in claim 7, wherein:
two laterally spaced non-magnetic shielding members are interposed between said hemispherical body portions; and an intervening member, fabricated from magnetic material, is interposed between said two non-magnetic shielding members.

13. A vise as set forth in claim 7, wherein:
said bore defined within said body is a through-bore extending entirely through said substantially spherical body.

14. A vise as set forth in claim 11, wherein:
said permanent magnet is a bar magnet.

15. A vise as set forth in claim 14, wherein:
the longitudinal axis of said bar magnet is disposed within the plane of said magnetic-shielding member.

16. A vise as set forth in claim 12, wherein:
said permanent magnet is a bar magnet.

17. A vise as set forth in claim 16, wherein:
the longitudinal axis of said bar magnet is disposed within a plane interposed between and parallel to the planes of said two laterally spaced non-magnetic shielding members.

18. A vise as set forth in claim 7, wherein:
said permanent magnet is a bar magnet.

19. A vise as set forth in claim 18, further comprising:
blind bore means defined within opposite ends of said bar magnet for receiving a tool for facilitating said rotational movement of said magnet between said first and second positions.

20. A vise as set forth in claim 7, further comprising:
aperture means defined within said support plate for permitting a portion of said substantially spherical body to project therethrough; and substantially hemispherical recess means defined within said vise unit for receiving said portion of said spherical body projecting through said support plate, whereby said vise unit is supported upon both said support plate and said substantially spherical body.

21. A vise, for supporting a workpiece, movable within three degrees of freedom about three mutually orthogonal X-Y-Z axes relative to a base, comprising:

a substantially spherical body;

a support plate movably mounted upon said substantially spherical body about two mutually orthogonal axes;

a vise unit movably mounted upon said support plate about a third one of said three mutually orthogonal axes; and magnetic means movably disposed within said substantially spherical body between a first position at which said magnetic means causes said support plate and said vise unit to be magneticcally locked in position relative to said substantially spherical body, and a second position at which said support plate and said vise unit are movable relative to said substantially spherical body so as to angularly position said workpiece disposed within said vise unit relative to said substantially spherical body and said base about said three mutually orthogonal X-Y-Z axes.

* * * * *